United States Patent [19]

Rhodes

[11] Patent Number: 4,905,112
[45] Date of Patent: Feb. 27, 1990

[54] SCENT CASSETTE

[76] Inventor: Steven W. Rhodes, 214 Elm St., Charleston, W. Va. 25302

[21] Appl. No.: 211,544

[22] Filed: Jun. 24, 1988

[51] Int. Cl.⁴ ............................................. G11B 23/02
[52] U.S. Cl. ........................... 360/132; 261/DIG. 65; 422/124
[58] Field of Search ................................. 360/132–133; 261/30, DIG. 65; 422/123–125

[56] References Cited

U.S. PATENT DOCUMENTS

| | | | |
|---|---|---|---|
| 2,720,013 | 10/1955 | Clarke | 21/126 |
| 3,993,444 | 11/1976 | Brown | 21/126 |
| 4,301,095 | 11/1981 | Mettler et al. | 261/30 |
| 4,339,079 | 7/1982 | Sato et al. | 422/123 X |
| 4,346,059 | 8/1982 | Spector | 422/125 |
| 4,358,807 | 11/1982 | Osanai et al. | 360/130.32 |
| 4,603,030 | 7/1986 | McCarthy | 261/30 |
| 4,743,406 | 5/1988 | Steiner et al. | 261/30 |

Primary Examiner—John H. Wolff
Attorney, Agent, or Firm—James Creighton Wray

[57] ABSTRACT

A preferred tape cassette has a generally rectangular relatively thin housing. Holes extend through the housing into an interior of the housing. A scent carrier is mounted inside of the housing. Scent flows from the carrier through the holes to an outside of the housing for providing scent from the inside of the housing to an atmosphere near the housing. Plural scent pads may be mounted within the housing.

24 Claims, 5 Drawing Sheets

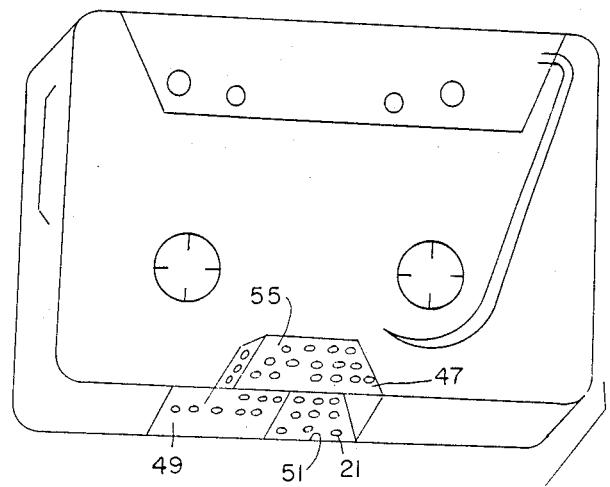
FIG. 4
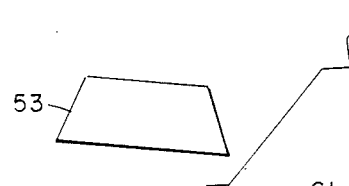
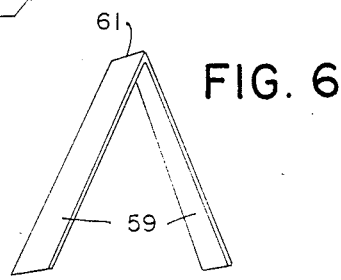
FIG. 6
FIG. 7
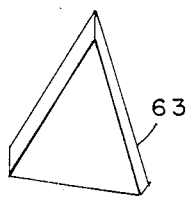
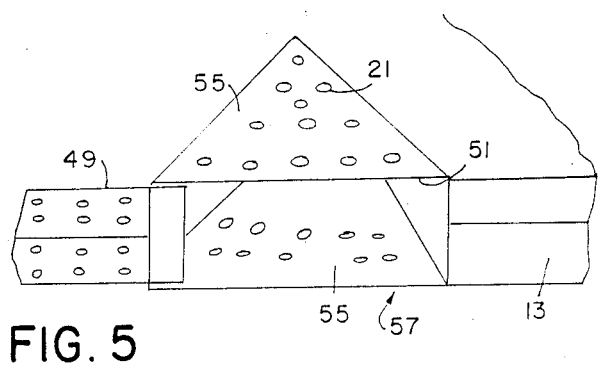
FIG. 5

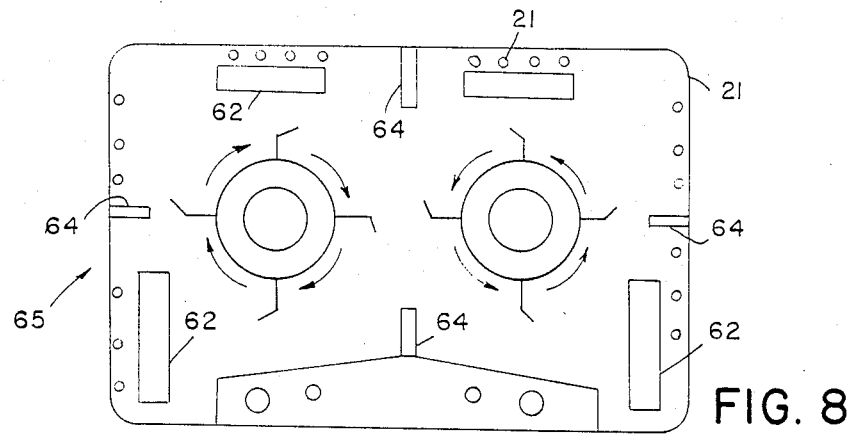
FIG. 8
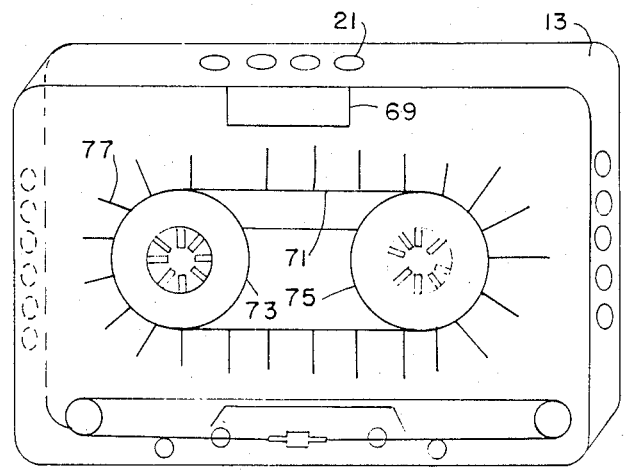
FIG. 9
FIG. 10
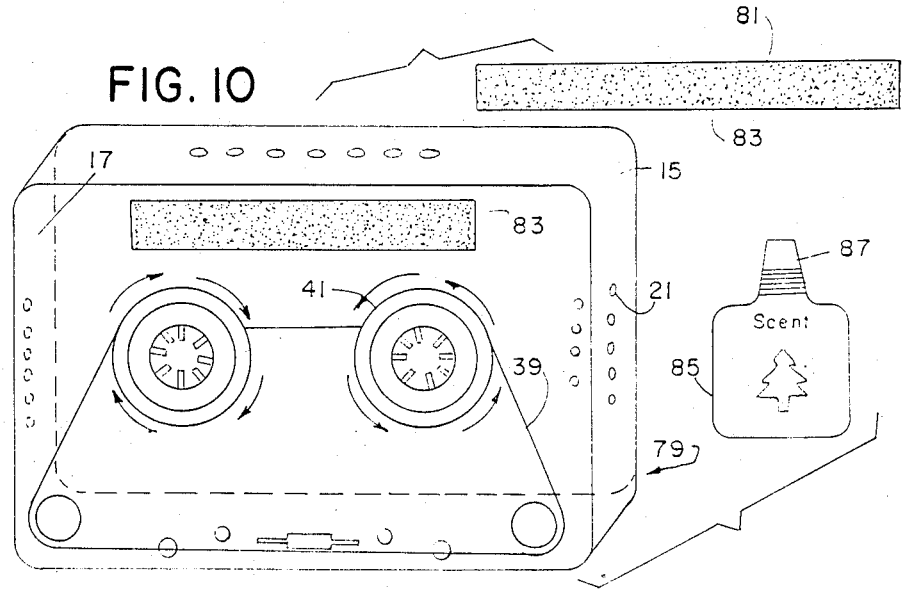

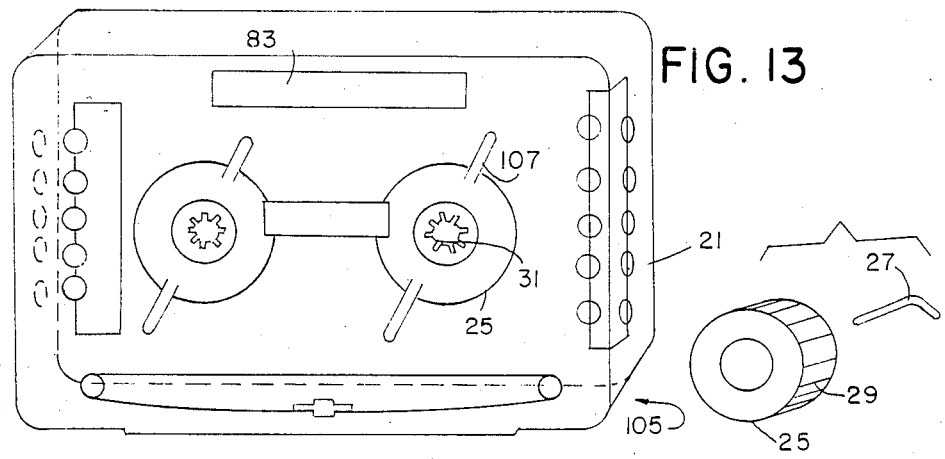
FIG. 13
FIG. 15
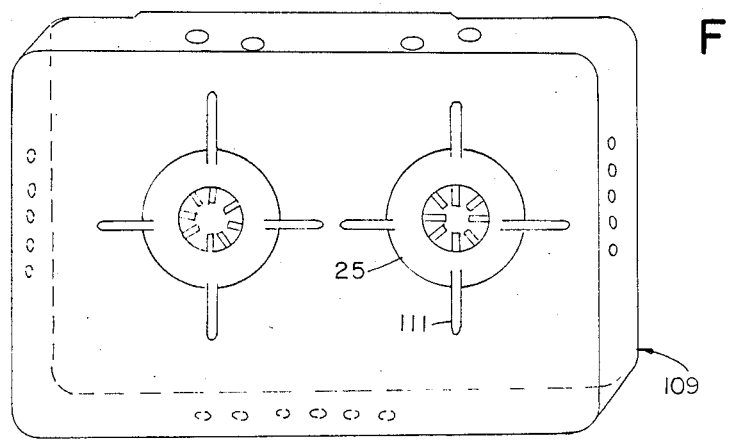
FIG. 14
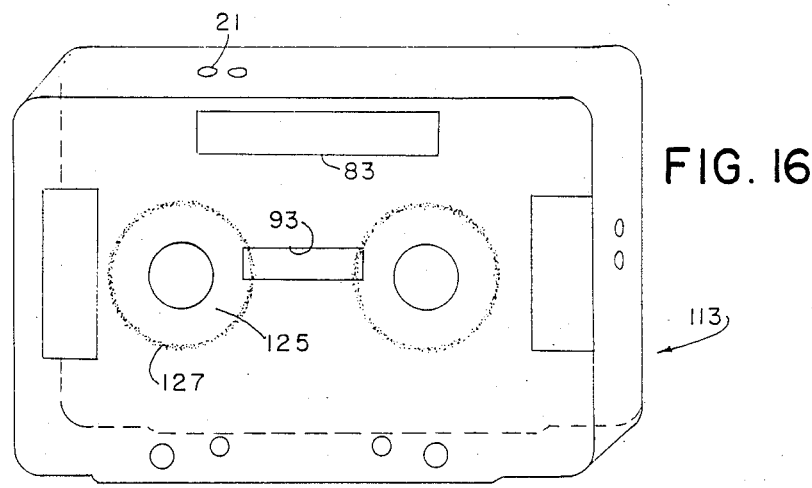
FIG. 16

SCENT CASSETTE

BACKGROUND OF THE INVENTION

This invention concerns tape cassettes.

The new apparatus and method are particularly useful with standard cassettes which are roughly 4×2½×⅜ inch and which typically have 30, 60 or 90 minute playing times. The invention may be used with other cassettes.

Typically, the cassettes have a uniform thickness except in the head and capstan receiving areas where the thickness of the housing is increased to about ½ inch over about a 2½ inch length and a ⅜ inch width.

Typically, cassette players play the tapes at low speed when playing, at a medium speed when fast forwarding and at a high speed when reversing. Some tape players have different speed protocols. Tape reeling wheels have central driving splines which engage splines on drive shafts to operate as take-up wheels. Usually either wheel may be driven as a take-up reeling wheel depending on the direction that the tape is moving during playing, fast forwarding or rewinding. Some players have only two speeds, one slow for playing and the other fast for winding.

Typically, a number of tapes suitable for playing are stored close to the cassette player. In an automobile the tapes are stored usually within reach of the driver so the driver may select, insert, remove and replace tapes while driving.

A particular problem exists when driving. A driver may reach for a tape and have to take his eyes off the road while ascertaining the subject of the tape. The taking of the eyes off the road for inserting a tape in a player may be dangerous.

SUMMARY OF THE INVENTION

The present invention solves problems of long standing in the prior art, such as the problem of how a driver selects a tape without taking his eyes from the road and such as how a blind person may be aware of the subject of a tape.

The present invention also provides a unique controllable release of scent in the area of a tape such as in automobiles where unwanted smells may reside. A driver may control the release of a scent from the cassette of the present invention by controlling the speed of the tape player.

Music tapes may be selected according to smells which identify the subject of the tape, which is especially useful for drivers who need not take their eyes off the road and for blind persons who otherwise must listen to the tapes to ascertain their content. The use of scented tapes to identify the content of the tape speeds the tape identification and recognition.

The invention has several aspects, among which are the using of a cassette to hold an odorant or deodorant, the use of air moving blades within a cassette to control the release of a scent from the cassette, the provision of holes in cassette walls to release scent, the replaceable scent cartridges and the use of a cassette as an air freshener.

A preferred tape cassette has a generally rectangular relatively thin housing. Holes extend through the housing into an interior of the housing. A scent carrier is mounted inside of the housing. Scent flows from the carrier through the holes to an outside of the housing for providing scent from the inside of the housing to an atmosphere near the housing. Plural scent pads may be mounted within the housing.

In a preferred embodiment the housing has a door for closing a scent-receiving opening. The scent carrier is a scent element placeable within the housing and held within the housing when the door is closed. The scent element is removable from the housing when the door is open. Preferably, a scent chamber is positioned within the housing adjacent the scent-receiving opening. The scent element is positionable in the chamber when the door is open and is held in the chamber when the door is closed.

Preferably, the scent-receiving chamber has foraminous walls, and the door is foraminous for passing air through the foraminous walls of the scent chamber and the door.

In a preferred form, the scent chamber is equilateral triangular in form with an opening which forms the scent element opening, and the scent element is equilateral triangular in form.

In one preferred embodiment, the door opening is provided centrally in an edge wall of the housing opposite a player head receiving opening. A preferred chamber has first and second V-shaped edge walls extending from ends of the opening inwardly within the housing and intersecting in an apex remote from the opening at a medial position with respect to the opening. In that embodiment, the scent chamber is positioned between rolled tape within the housing such that rolled tape does not contact the scent chamber.

In a preferred embodiment, the edge walls of the scent chamber extend between opposite side walls of the housing and opposite side walls of the housing between the edge walls of the chamber are foraminous.

In one preferred embodiment of the invention, reeling wheels are mounted between bearings formed in the housing. Fan blades are mounted on the reeling wheels for fanning air within the cassette at low speed when a recorder is in a play position, at intermediate speed when a player is in a fast forward condition and at high speed when a player is in a rewind condition.

A preferred embodiment has tape guiding rollers mounted in corners of the cassette adjacent a tape playing edge thereof and a continuous tape looped around the rollers.

A preferred scent cassette has tape reel bearings mounted within side walls, reeling wheels mounted on the bearing and air moving means mounted on the reeling wheels.

Preferably, the air moving means comprises fan blades mounted on the wheels.

In one embodiment, the air moving means has a continuous band around more than one wheel within the housing and blades extending outward from the band for moving air within the housing while one of the wheels is driven.

In one preferred embodiment bearings are mounted in the housing, and tape reel wheels are mounted on the bearings. Tape is mounted on the wheels and extends around tape guide rollers and across a tape-playing opening. The tape is prerecorded and scent is associated with the recording on the tape thereby providing means for identifying the content of the tape according to the scent.

A preferred method of providing scents to an atmosphere includes mounting a scent holding element inside a tape cassette housing and releasing scent through openings in walls of the housing.

The preferred method further includes mounting air moving means on tape reeling wheels in the cassette, driving at least one of the wheels and moving air through openings in the cassette with the air moving means.

The preferred method includes identifying recordings on the tape on the cassette according to scent in the cassette.

The preferred method further includes opening a door in a wall of the cassette, depositing a scent-carrying element within a scent compartment within the cassette and closing the door.

These and further and other objects and features of the invention are apparent in the disclosure which includes the above and ongoing description including the claims and the drawings.

BRIEF DESCRIPTION OF THE DRAWINGS

FIG. 4 is a tape cassette of the present invention showing a door, scent chamber and scent cartridge.

FIG. 5 is a detail of a preferred scent chamber.

FIG. 6 is a detail of edge walls of the chamber of FIG. 5.

FIG. 7 is a detail of a scent cartridge for insertion in the chamber of FIG. 5.

FIG. 8 is a detail of a modified form of the invention shown in FIG. 1.

FIG. 9 is a detail of a modified form of the invention shown in FIGS. 1 and 8.

FIG. 10 is a further detail of the invention shown in FIG. 3.

FIG. 13 is an alternate form of the invention shown in FIGS. 1 and 12.

FIG. 14 is an alternate form of the invention shown in FIGS. 1, 12 and 13.

FIG. 15 is an detail of the construction of the invention shown in FIGS. 1, 13 and 14.

FIG. 16 is an alternate form of the invention shown in FIGS. 1, 13 and 14.

DETAILED DESCRIPTION OF THE DRAWINGS

Figure 1:
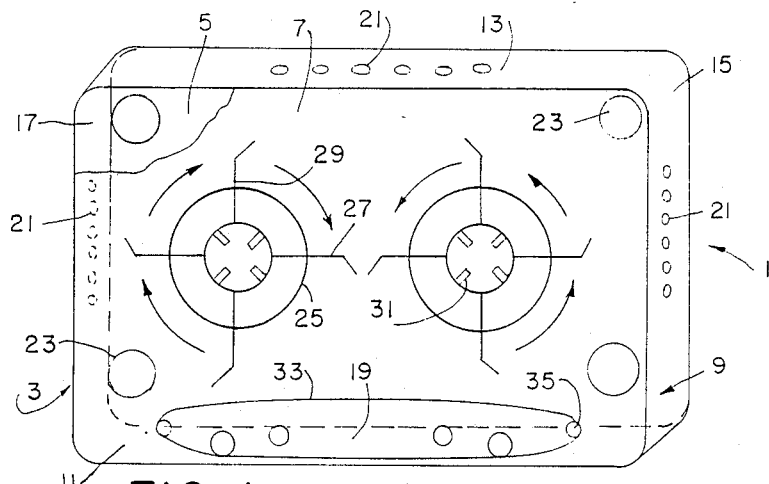
FIG. 1 is a schematic representation of a cassette used to distribute scent.

FIG. 1 shows a scent exuding cassette generally indicated by the numeral 1. The cassette has a generally thin rectangular shape which is enclosed by walls 3. Large side walls 5 and 7 support the tape. The top of side wall 7 is shown in transparent form for ease in understanding the invention. In a preferred embodiment all of the walls 3 are opaque.

Edge walls generally indicated by the numeral 9 join the bottom and top side walls 5 and 7. The edge walls include a head receiving wall 11 through which tape is normally exposed, an opposite long edge wall 1 and opposite short edge walls 15 and 17. As is conventional in cassette manufacture, reel bearings are formed directly in the top and bottom side walls 5 and 7. In the embodiment shown in FIG. 1 a large conventional tape exposing opening 19 is formed in the head receiving edge wall 11. Other openings 21 are formed in the edge walls 13, 15 and 17. Together the openings permit the flow of air in and out of the cassette to carry scent. The number and arrangement of the holes as shown provides an establishment of equilibrium in which a limited amount of scent flows through the holes in at-rest conditions.

Scent is provided on scent pads 23 which are attached to the bottom side wall 5. Tape winding reel wheels 25 are provided with fan blades 27 mounted in slits 29 in the wheels to stir air within the cassette as the wheels are rotated. The wheels are provided with six inward facing splines schematically illustrated as elements 31 in the drawing which engage with the splined take-up shafts of a tape player. Controlling speeds of the wheels according to the play, fast forward and rewind settings, a player controls the stirring of air within the cassette and hence controls the amount of scent exuded from the cassette.

Usually only one reel/fan combination rotates at one time, since usually only one take-up shaft is active in a tape player. The other fan/reel combination may rotate by air current induction within the cassette.

Since some players operate only when a tape is present, an endless tape 33 is provided around the standard tape guiding rollers 35, which are conventional in cassettes, so that the player may sense a tape 33 within the playing opening 19 of the cassette.

Figure 2:
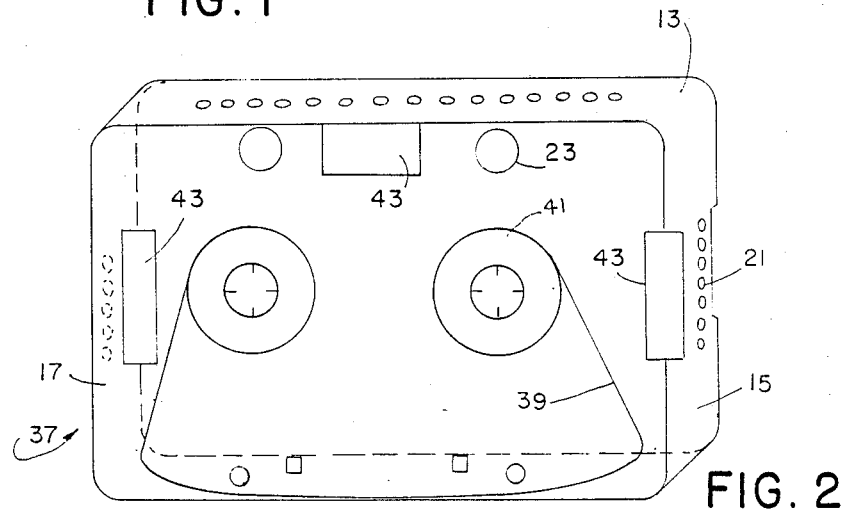
FIG. 2 is a schematic representation of a dual purpose, special purpose head cleaner tape cassette.

In an alternate form of the invention shown in FIG. 2, a head cleaner cassette 37 exudes scent from openings 21 in edge walls 13, 15 and 17.

As is conventional, a head cleaner tape 39 is provided on conventional reels 41 with drive sprockets 31. Scent pads 23 are provided in the interior of the cassette. Double sided sticky tapes 43 are provided on the inside of walls near edge walls 13, 15 and 17 to attract and hold debris which falls off the head cleaner tape within the cassette.

The arrangement and number of scent holes 21 is coordinated with the number and arrangement of scent pads 23 so that a modest amount of scent is released from the cassette while the head cleaner tape is held within a tape storage box. The double sided sticky tapes 43 are positioned on the inside of the tape cassette walls near the openings 21 to attract and trap any solid particles or dust which enters the cassette body through the openings.

Figure 3:
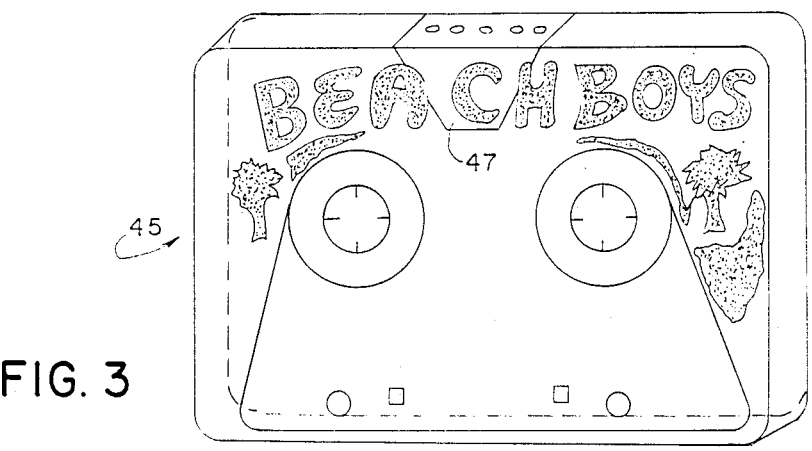
FIG. 3 is a schematic representation of a tape cassette with a scent identifier.

In another form of the invention as shown in FIG. 3, a conventional music playing cassette is generally indicated by the numeral 45.

The music playing cassette has a scent pad held within a specially formed compartment 47 formed in the cassette body near the long edge wall 13.

As shown in FIG. 4, a sliding door 49 opens and closes an opening 51 in the long edge wall 13. A scent refill cartridge 53 fits through the opening 51 and is held within scent chamber 47 As shown in the drawings, scent passing openings 21 are provided in wall portions 55 of the chamber to communicate the scent in the scent refill cartridge 53 with the atmosphere surrounding the tape cassette. Similar scent passing holes 21 are formed in the sliding door 49.

The number and arrangement of the scent passing openings is coordinated with the scent in the scent refill cartridge to provide a modest amount of scent. Preferably, the scent in the cartridge 53 is coordinated with the musical tape in the cassette so that the tape may be identified by a unique scent. For example, a Beach Boys tape might be accompanied by a coconut oil or suntanning lotion scent. Christmas music may be accompanied by a Christmas pine tree scent, for example. In one form of the invention blank scent refill cartridges are provided in a kit with small vials of a number of distinct scents so that a person may select the tape scents to be used and may replenish the scent if necessary.

As shown in FIGS. 5–7, a preferred form of the chamber has a triangular form, as generally indicated by the numeral 57. The opening 51 in the end wall 13 of the tape cartridge extends between opposite side walls 5 and 7. The foraminous side walls 55 of the chamber 57 are flush with the main side walls 5 and 7 of the cartridge. Solid barrier walls 59 extend inward from the opening 51 between the edges of the foraminous side walls and terminate at a joint apex 61 remote from the opening 51. The barrier walls prevent material within the scent chamber 57 from contacting the tape on the reels. The triangular shape and size of the scent chamber 57 are coordinated to fit between tape accumulated on the reels so that when all of the tape is wound on one reel, the barrier walls 59 are separated from the tape.

In conventional high quality music playing tapes, the inside of the tape is sealed as much as possible with the only openings to the outside being the openings through which the tape passes near the guide rollers. The recording preventing punch-out tabs which are conventional along the long edge 13 of a tape cassette have small chambers formed around the punch-out tabs to prevent access to the interior of the cassette.

The barrier wall 59 performs a similar function of maintaining the interior of the cassette inviolate to dust.

As shown in FIG. 7, the scent pad refill 63 has a size which snugly but loosely fits between the barrier walls 59 and the foraminous walls 55 and the foraminous door 49 so that the pad does not vibrate when held in place within the chamber 57 but so the pad is easily removable and insertable.

Referring to FIG. 8, the tape cassette 65 is similar to the tape cassette shown in FIG. 1 except that rectangular scent pads 62 are fastened to the walls of the cassette. Separators 64 extend into the cassette from edge walls to improve air flow through air flow openings 21 which are arranged in groups 66.

As shown in FIG. 9, cassette 67 is similar to cassette 1 shown in FIG. 1. A scent pad 69 is provided near openings 21 in the long edge wall 13. Fan blades 27 are provided by an endless band 71 which extends between both tape winding reels 73 and 75. Rubber or plastic blades 77 extend perpendicularly from band 71 to stir air within the cassette 67 and to move scented air through the openings 21.

FIG. 10 shows one form of the invention in cassette 79 which is similar to the cassette 37 shown in FIG. 2. A head cleaning tape 39 is provided on tape winding reels 41. Holes 21 are provided in edges 13, 15 and 17 and additionally in the upper side 7.

A double sided tape 81 mounts an absorbent gauze or other cloth 83 within the cassette on the inside of either the bottom wall 5 or the upper wall 7. A plastic scent vial 85 with a dropper tip 87 is used to place scent upon cloth pad 83. Scent may be added to the pad before it is mounted in the cassette. Nozzle 87 of scent bottle 85 may be used to drop scent onto the mounted cloth 83 through openings 21.

Figure 11:
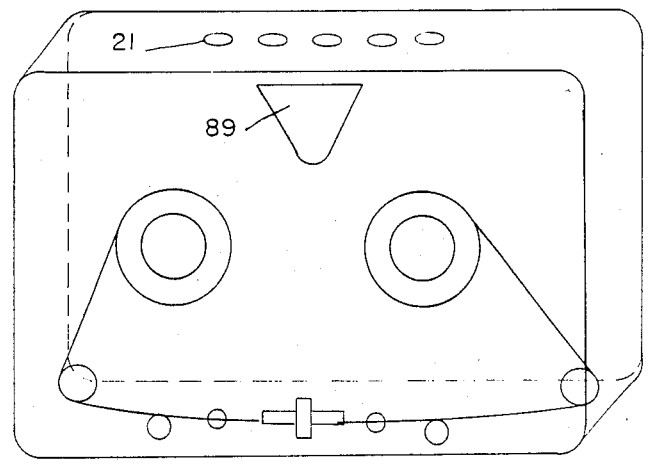
FIG. 11 is a detail of an invention similar to that shown in FIG. 3.

FIG. 11 is a modified form of the invention shown in FIG. 3 in which a scented pad 89 is permanently mounted in cassette 91 near scent openings 21. The openings 21 are selected and coordinated with the scented pad 89 so that only a small amount of scent is released which is sufficient to sniff the scent through the openings 21.

Figure 12:
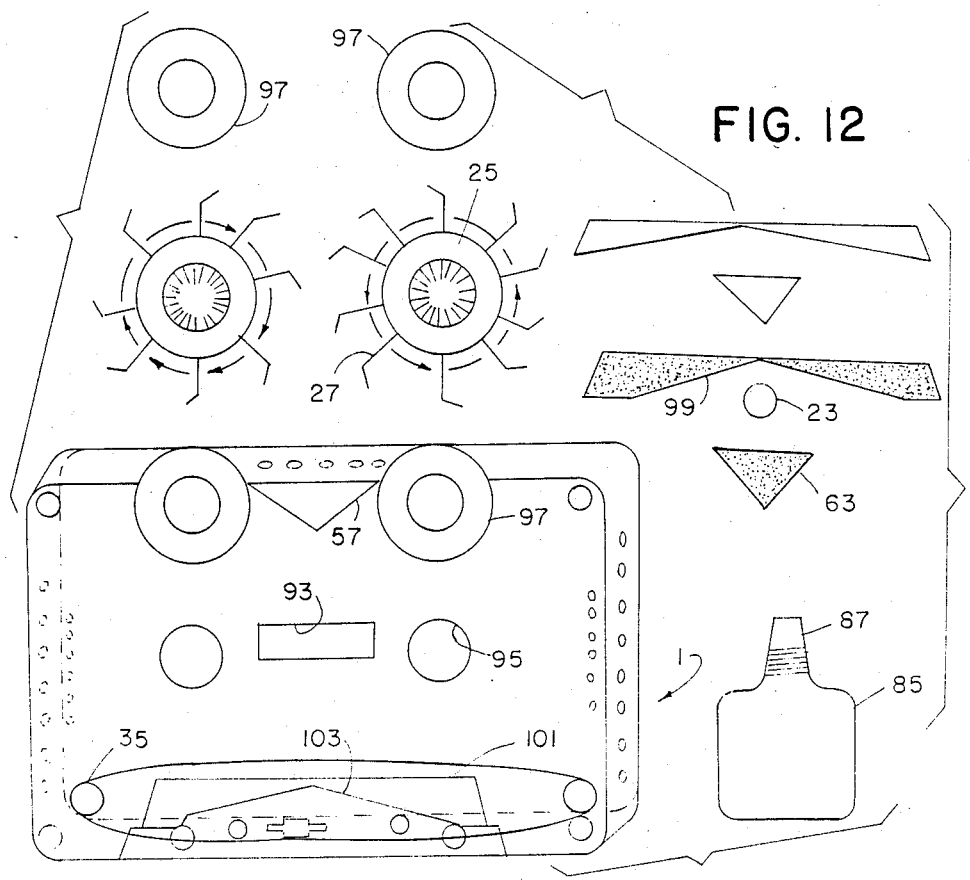
FIG. 12 is an exploded view of the invention shown in FIG. 1.

FIG. 12 shows a scent cassette 1 similar to the construction shown in FIG. 1. A conventional side wall 7 has a transparent window 93 for viewing the working of the fan blades. The top and bottom side walls are provided with openings 95 formed with slightly inwardly extending lips to provide bearing surfaces for the tape reeling wheels 25. Four thin plastic discs 97 are positioned on opposite sides of the wheels 25 to provide thrust bearings for the wheels against the insides of the walls of the cassette. Multiple fan blades 27 are radially provided on the wheels 25. Openings 21 are provided in the edge walls and in the top and bottom side walls. A scent pad refill 63 is provided in the scent-receiving chamber 57. Alternatively or in addition, trapezoid shaped scent pads 99 may be glued or mounted with double sided adhesive tape in corners of the cassette adjacent edge wall 13. Replenishing scent fluid may be provided in a plastic vial 85 with a quick opening and closing nozzle 87.

As shown in the lower portion of FIG. 12, the cassette 1 has a reinforced trapezoidal section 101 which is raised adjacent the tape playing edge 21. An internal wall 103 within the raised portion 101 separates the tape playing opening from the interior of the cassette 1 in a conventional manner.

FIG. 13 shows another form of the invention in which scent-holding pads 83 are glued or mounted with double sided adhesive tape inside a cassette 105. Two diametrically opposed fan blades 107 are mounted on each wheel 25.

As shown in FIG. 14, a similar cassette 109 has four straight blades 111 on each wheel 25.

As shown in FIG. 16, the wheels 25 have slits 29 which receive the blades 27.

An alternate form of the invention is shown in FIG. 16 in which the wheels 125 of cassette 113 are covered with absorbent cloth 127 to disperse the scent. Additional scent pads 83 may optionally be employed within the cassette 113. The scent pads 127 are mounted on the wheel by glue in a preferred embodiment.

The present invention provides an auto cassette air freshener. All scents are dry solids in a preferred embodiment. In one form of the invention the cassette has a double function of acting as an air freshener while cleaning a head and collecting dust particles and other foreign matter from within the player. In another form of the invention the air is scented with a scent which relates to the music and the tape is identified by smelling the cassette.

One form of the invention has scent refills which fit within a scent chamber closed by a door, preferably a sliding door.

The invention includes the concept of putting air deodorizer or scents in a cassette and the concept of adding fan blades to otherwise conventional reeling wheels and providing holes in a cassette. One form of the invention uses liquid scent which is absorbed into a cloth or a rubber-like material and then fully dried before placing in a cassette. In all cases where fine holes are used to communicate air into and out of the cassette, fine screens may cover the holes inside the cassette to keep airborne materials out.

When cassettes are not in use they may be placed in a console or over a sunvisor for constant release of scent or deodorizer. In a regular music cassette movement of the tape wheels causes a small amount of internal air movement which facilitates the release of the scent. The scent may be released within the cassette for further release out of the cassette or the scent may be released directly out of the cassette by being released to the interior of the cassette.

A preferred form of the invention in which fan blades are mounted inside the cassette is made by cutting slits around conventional reeling wheels and placing plastic blades in the slit which are about ⅛ inch wide and ½ inch long and which are thin and flexible. As the blades are inserted in the slits, glue is added to bond the blades in place. Preferably the blades are bent ⅛ inch from the tips toward the direction of rotation. The invention may be used with conventional cassettes by opening the housing after taking out the screws, taking the tape off the wheels and gluing pads within the housing and adding scent to the pads. Fans or air movers are then mounted on the wheels and the wheels are repositioned in the housing between the thin plastic bearings. Scented pads are glued within the housing or mounted in a pad-receiving chamber or both. A continuous tape is threaded through the tape playing opening and around the rollers and inside the cassette and the cassette is reassembled ready for use. The present invention provides auto cassette air fresheners which deodorize stale smoky air in automobiles and provides audio tapes that can be identified by smell by blind persons and by drivers when driving a car.

The deodorizing features regulated scent release according to player speed. The invention eliminates the dangerous air fresheners hanging from rearview mirrors where they may obstruct view and dangerous scented furry animals which also obstruct views. The invention avoids stick-on air fresheners that often leave a spot when they are taken away.

The invention has many advantages which are described herein and which are obvious from the structures and methods described herein. While the invention has been described with reference to specific embodiments, modifications and variations of the invention may be constructed without departing from the scope of the invention which is defined in the following claims.

I claim:

1. A tape cassette having a generally rectangular relatively thin housing having holes extending through the housing into an interior of the housing and having a scent carrier and means for mounting the carrier inside of the housing for flowing the scent from the carrier through the holes to an outside of the housing for providing scent from the inside of the housing to an atmosphere near the housing.

2. The apparatus of claim 1 wherein the carrier comprises plural scent pads within the housing.

3. The apparatus of claim 2 further comprising a scent-receiving opening in the housing and a door for closing the scent-receiving opening and means for mounting the door on the housing to close the scent-receiving opening and wherein the scent carrier comprises a scent element placeable within the housing and held within the housing when the door is closed.

4. The apparatus of claim 3 wherein the scent element is removable from the housing when the door is open.

5. The apparatus of claim 3 further comprising a scent chamber positioned within the housing adjacent the scent-receiving opening and wherein the scent element is positionable in the chamber when the door is open and is held in the chamber when the door is closed.

6. The apparatus of claim 5 wherein the scent-receiving chamber has foraminous walls and wherein the door is foraminous for passing air through the foraminous walls of the scent chamber and the door.

7. The apparatus of claim 5 wherein the scent chamber is equilateral triangular in form with an opening which forms the scent element opening and wherein the scent element is equilateral triangular in form.

8. The apparatus of claim 7 wherein the door opening is provided centrally in an edge wall of the housing opposite a player head receiving opening and wherein the chamber comprises first and second V-shaped edge walls extending from ends of the opening inwardly within the housing and intersecting in a V remote from the opening at a medial position with respect to the opening whereby the scent chamber is positioned between rolled tape within the housing such that rolled tape does not contact the scent chamber.

9. The apparatus of claim 8 wherein the edge walls of the scent chamber extend between opposite side walls of the housing and wherein opposite side walls of the housing between the edge walls of the chamber are foraminous.

10. The appartus of claim 1 further comprising reeling wheels mounted between bearings formed in the housing and fan blades mounted on the reeling wheels for fanning air within the cassette at low speed when a recorder is in a play position, at intermediate speed when a player is in a fast forward condition and at high speed when a player is in a rewind condition.

11. The apparatus of claim 10 further comprising tape guiding rollers mounted in corners of the cassette adjacent a tape playing edge thereof and a continuous tape looped around the rollers.

12. The apparatus of claim 1 further comprising tape reel bearings mounted within side walls, reeling wheels mounted on the bearing and air moving means mounted on the reeling wheels.

13. The apparatus of claim 12 wherein the air moving means comprises fan blades mounted on the wheels.

14. The apparatus of claim 12 wherein the air moving means comprises a continuous band around more than one wheel within the housing and blades extending outward from the band for moving air within the housing while one of the wheels is driven.

15. The apparatus of claim 1 further comprising bearings mounted in the housing and tape reel wheels mounted on the bearings and tape mounted on the wheels and extending around tape guide rollers and across a tape-playing opening, the tape being prerecorded, and wherein the scent is associated with the recording on the tape thereby providing means for identifying the content of the tape according to the scent on the scent carrier.

16. The method of providing scents to atmosphere comprising mounting a scent holding element inside a tape cassette housing and releasing scent through openings in walls of the housing.

17. The method of claim 16 further comprising mounting air moving means on tape reeling wheels in the cassette, driving at least one of the wheels and moving air through openings in the cassette with the air moving means.

18. The method of claim 17 further comprising identifying recordings on the tape on the cassette according to scent in the cassette.

19. The method of claim 17 further comprising opening a door in a wall of the cassette, depositing a scent-carrying element within a scent compartment within the cassette and closing the door.

20. Scent bearing apparatus for insertion in a tape cassette housing comprising a block of material having scent embedded therein, the block being configured for being received within a scent receiving opening in the cassette and being configured for positioning within a scent element housing chamber.

21. The apparatus of claim 20 wherein the scent element comprises an elongated block of material.

22. The apparatus of claim 21 wherein the block has three rectangular side walls.

23. The apparatus of claim 21 wherein the block comprises a truncated triangular shape having four generally rectangular side walls.

24. The apparatus of claim 20 wherein the scent element comprises a generally triangular block of material having rectangular side walls.

* * * * *